(12) United States Patent
Shaddock et al.

(10) Patent No.: US 9,586,342 B2
(45) Date of Patent: Mar. 7, 2017

(54) METHOD OF INJECTION SEALING GEL INTO A RECESS OF A WORK PIECE

(71) Applicants: Tyco Electronics (Shanghai) Co. Ltd., Shanghai (CN); Tyco Electronics Corporation, Berwyn, PA (US)

(72) Inventors: Robert Neil Shaddock, Doylestown, PA (US); Fengchun Xie, Shanghai (CN); Dandan Zhang, Shanghai (CN); Lvhai Hu, Shanghai (CN)

(73) Assignees: Tyco Electronics (Shanghai) Co. Ltd., Shanghai (CN); Tyco Electronics Corporation, Berwyn, PA (US)

( * ) Notice: Subject to any disclaimer, the term of this patent is extended or adjusted under 35 U.S.C. 154(b) by 76 days.

(21) Appl. No.: 14/337,747

(22) Filed: Jul. 22, 2014

(65) Prior Publication Data

US 2015/0021825 A1 Jan. 22, 2015

(30) Foreign Application Priority Data

Jul. 22, 2013 (CN) .......................... 2013 1 0308368

(51) Int. Cl.
| | | |
|---|---|---|
| *B29C 31/04* | (2006.01) | |
| *B29C 39/40* | (2006.01) | |
| *F16J 15/32* | (2016.01) | |
| *B29D 99/00* | (2010.01) | |
| *B29C 39/02* | (2006.01) | |
| *F16J 15/14* | (2006.01) | |
| *B29C 37/00* | (2006.01) | |

(52) U.S. Cl.
CPC .......... *B29C 31/041* (2013.01); *B29C 37/005* (2013.01); *B29C 39/021* (2013.01); *B29C 39/40* (2013.01); *B29D 99/0053* (2013.01); *F16J 15/14* (2013.01); *F16J 15/328* (2013.01)

(58) Field of Classification Search
CPC ..... B05C 5/02; B29C 67/0062; B29C 31/041; B29C 39/021; B29C 39/40; B29C 37/005; H05K 5/064; B29D 99/0053
See application file for complete search history.

(56) References Cited

U.S. PATENT DOCUMENTS

| | | | | |
|---|---|---|---|---|
| 5,532,431 A | * | 7/1996 | Saka | ........................ B29C 39/24 174/521 |
| 5,731,541 A | * | 3/1998 | Bernd | .................... B29C 31/045 174/358 |

(Continued)

FOREIGN PATENT DOCUMENTS

| | | | |
|---|---|---|---|
| GB | 460239 | * | 1/1937 |
| JP | 60-237267 | * | 11/1985 |
| JP | 2001-280507 | * | 10/2001 |

*Primary Examiner* — Jill Heitbrink
(74) *Attorney, Agent, or Firm* — Barley Snyder

(57) ABSTRACT

A method of injecting a sealing gel into a recess of a work piece, comprising steps of: injecting the sealing gel into the recess and stopping the injection of the sealing gel when the sealing gel reaches a first depth less than the total depth of the recess; after the sealing gel has cooled and solidified, continuing the injection of the sealing gel into the recess and stopping the injection of the sealing gel when the sealing gel reaches another depth higher than the first depth; and repeatedly performing the previous step until the cooled and solidified sealing gel in the recess has a top surface beyond a sealing interface surface of the work piece.

14 Claims, 3 Drawing Sheets

(56) References Cited

U.S. PATENT DOCUMENTS

| | | | | |
|---|---|---|---|---|
| 5,882,729 | A * | 3/1999 | Kahl | H05K 9/0015 |
| | | | | 174/370 |
| 6,096,413 | A * | 8/2000 | Kalinoski | F16J 15/064 |
| | | | | 174/358 |
| 6,222,122 | B1 * | 4/2001 | Davidson | H05K 5/062 |
| | | | | 174/554 |
| 6,303,180 | B1 * | 10/2001 | Bunyan | F16J 15/14 |
| | | | | 427/197 |
| 6,420,649 | B1 * | 7/2002 | Kahl | H05K 9/0015 |
| | | | | 174/361 |
| 6,451,374 | B1 * | 9/2002 | Watchko | F16J 15/024 |
| | | | | 427/284 |
| 6,822,161 | B2 * | 11/2004 | Komatsu | H05K 5/061 |
| | | | | 174/367 |
| 2005/0077683 | A1 * | 4/2005 | Comert | B60R 13/06 |
| | | | | 277/300 |
| 2009/0243233 | A1 * | 10/2009 | Uranaka | F16J 15/14 |
| | | | | 277/650 |
| 2011/0038077 | A1 * | 2/2011 | Uranaka | C09K 3/1021 |
| | | | | 360/99.22 |
| 2011/0210517 | A1 * | 9/2011 | Sekita | C04B 41/009 |
| | | | | 277/316 |

\* cited by examiner

METHOD OF INJECTION SEALING GEL INTO A RECESS OF A WORK PIECE

CROSS-REFERENCE TO RELATED APPLICATIONS

This application claims the benefit of the filing date under 35 U.S.C. §119(a)-(d) of Chinese Patent Application No. 201310308368.X filed on Jul. 22, 2013 in the State Intellectual Property Office of China, the whole disclosure of which is incorporated herein by reference.

FIELD OF THE INVENTION

The present invention relates to a method of injecting a sealing gel into a recess of a work piece.

BACKGROUND

In the prior art, there are two solutions to inject a sealing gel into a recess of a work piece known to Applicants. One of the two solutions is to inject a fluid sealing gel into the recess of the work piece with an injection mold mounted on the work piece. In this case, the fluid sealing gel is directly injected into an inner chamber of the injection mold until the fluid sealing gel fully fills the inner chamber of the injection mold. The other of the two solutions is to inject the fluid sealing gel into the recess of the work piece directly through an opening of the recess. In this case, the fluid sealing gel is injected into the recess fully.

As for the solution with the injection mold, since an injection port and a vent hole are formed in the injection mold, a residual sealing gel is generally left on the work piece at the injection port and the vent hole after finishing the injection of the fluid sealing gel. Therefore, it is necessary to remove the residual sealing gel from the work piece, taking a lot of time, and increasing the cost.

As for the solution in which the fluid sealing gel is fully injected into the recess directly through the opening of the recess, since the sealing gel can experience thermal expansion and contraction, after the fluid sealing gel is cooled and solidified, a concave surface or depression is formed at about the middle of the surface of the solidified sealing gel. This depression in the surface of the solidified sealing gel results in a surface lower than the sealing interface surface of the work piece, thereby reducing the sealing effect of the sealing gel.

FIG. 1A, FIG. 1B and FIG. 1C show the solution in which the fluid sealing gel is fully injected into the recess directly through the opening of the recess. As shown in FIG. 1A, the recess 11 is formed in the work piece 10. As shown in FIG. 1B, the fluid sealing gel 12 is fully injected directly into the recess 11. As shown in FIG. 1C, after the fluid sealing gel is cooled and solidified, because of thermal expansion and contraction, a concave surface or depression is formed at about the middle of the surface of the solidified sealing gel. This depression in the surface of the solidified sealing gel results in a surface lower than the sealing interface surface of the work piece 10, thereby reducing the sealing effect of the sealing gel.

SUMMARY

The present invention has been made to overcome or alleviate at least one aspect of the above mentioned disadvantages.

According to an object of the present invention, there is provided a method of injecting a sealing gel into a recess of a work piece. The method does not need an injection mold and can ensure a surface of the cooled and solidified sealing gel beyond a sealing interface surface of the work piece.

According to an aspect of the present invention, there is provided a method of injecting a sealing gel into a recess of a work piece, comprising steps of:

S100: injecting the sealing gel into the recess and stopping the injection of the sealing gel when the sealing gel reaches a first depth less than a total depth of the recess;

S200: after the sealing gel has cooled and solidified, continuing the injection of the sealing gel into the recess and stopping the injection of the sealing gel when the sealing gel reaches another depth higher than the first depth; and

S300: repeatedly performing the step S200 until the cooled and solidified sealing gel in the recess has a top surface extending beyond a sealing interface surface of the work piece.

In the above exemplary embodiments of the present invention, the fluid sealing gel is injected into the recess of the work piece step by step, instead of being injected into the recess fully at one time. Therefore, after many times of injection, the sealing gel in the recess can be formed with a top surface extending beyond the sealing interface surface of the work piece. In this way, when the work piece is mated with a mating work piece, the sealing gel extending beyond the sealing interface surface of the work piece can be compressed by the mating work piece to improve the sealing performance between the work pieces.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF THE EMBODIMENT(S)

Figure 1A:
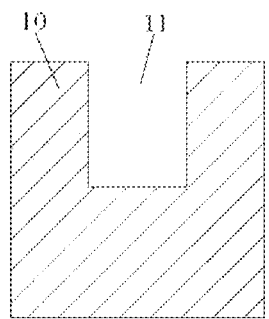
FIG. 1A, FIG. 1B and FIG. 1C show a prior art method of injecting sealing gel into a recess of a work piece in which a fluid sealing gel is fully injected directly through an opening of the recess.
Figure 1B:
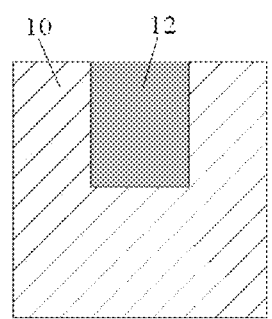
Figure 1C:
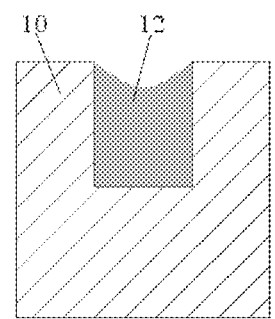

Exemplary embodiments of the present invention will be described hereinafter in detail with reference to the attached drawings, wherein the like reference numerals refer to the like elements. The present invention may, however, be embodied in many different forms and should not be construed as being limited to the embodiment set forth herein; rather, these embodiments are provided so that the present disclosure will be thorough and complete, and will fully convey the concept of the present invention to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a method of injecting a sealing gel into a recess of a work piece, comprising steps of:

S100: injecting the sealing gel into the recess and stopping the injection of the sealing gel when the sealing gel reaches a first depth less than a total depth of the recess;

S200: after the sealing gel has been cooled and solidified, continuing the injection of the sealing gel into the recess and stopping the injection of the sealing gel when the sealing gel reaches another depth higher than the first depth; and S300: repeatedly performing the step S200 until the cooled and solidified sealing gel in the recess has a top surface beyond a sealing interface surface of the work piece.

FIG. 2A, FIG. 2B, FIG. 2C, FIG. 2D, FIG. 2E, FIG. 2F, FIG. 2G, FIG. 2H and FIG. 2I show a method of injecting a fluid sealing gel into a recess 110 of a work piece 100 according to an exemplary embodiment of the present invention.

Figure 2A:
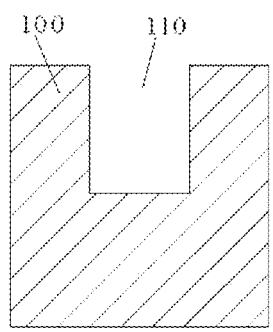
FIG. 2A, FIG. 2B, FIG. 2C, FIG. 2D, FIG. 2E, FIG. 2F, FIG. 2G, FIG. 2H and FIG. 2I show a method of injecting a fluid sealing gel into a recess of a work piece according to an exemplary embodiment of the present invention.

As shown in FIG. 2a, the recess 110 is formed in the work piece 100. Recess 110 can extend along a predetermined path, such as a ring path, a linear path or a curved path, in the surface of the work piece 100.

Hereinafter, an exemplary embodiment of the present invention will be described with reference to FIGS. 2B to 2I.

Figure 2B:
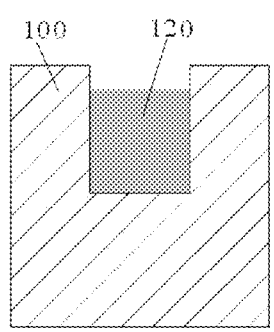

First, as shown in FIG. 2B, injecting the sealing gel 120 into the recess 110 of the work piece 100 and stopping the injection of the sealing gel 120 when the sealing gel 120 reaches a first depth less than a total depth of the recess 110.

Figure 2C:
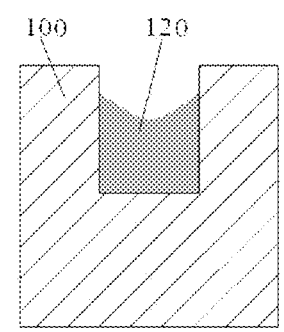

Second, as shown in FIG. 2C, cooling the injected sealing gel 120 for a period of time so that the injected sealing gel 120 is solidified; after the injected sealing gel 120 is cooled and solidified, a concave surface or depression is formed at about the middle of the surface of the solidified sealing gel 120.

Figure 2D:
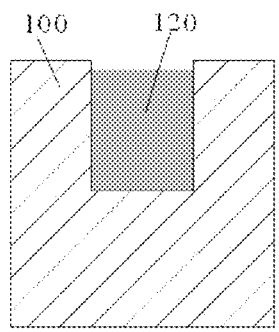

Third, as shown in FIG. 2D, after the sealing gel has been cooled and solidified, continuing the injection of the sealing gel 120 into the recess 110 and stopping the injection of the sealing gel 120 again when the sealing gel 120 reaches a second depth higher than the first depth and less than the total depth of the recess 110.

Figure 2E:
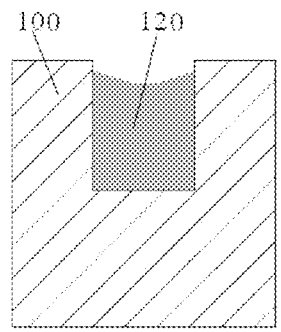

Fourth, as shown in FIG. 2E, cooling the currently injected sealing gel 120 for a period of time so that the currently injected sealing gel 120 is solidified; after the currently injected sealing gel 120 is solidified, a concave surface or depression is formed at about the middle of the surface of the solidified sealing gel 120. It should be noted that the concave surface or depression, formed in the surface of the sealing gel of FIG. 2e injected the second time, is shallower than the concave surface or depression formed in the surface of the sealing gel of FIG. 2C injected the first time, because the injection volume of the sealing gel the second time is less than the injection volume of the sealing gel the first time. In an example, the injection volume of the sealing gel the second time may be about ½ of the injection volume of the sealing gel the first time.

Figure 2F:
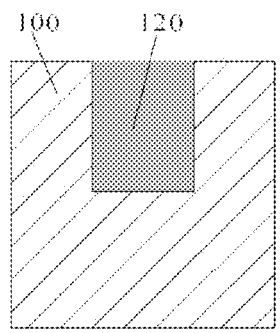

Fifth, as shown in FIG. 2F, after the sealing gel injected the second time has been cooled and solidified, continuing the injection of the sealing gel 120 into the recess 110 and stopping the injection of the sealing gel 120 when the sealing gel 120 reaches the total depth of the recess 110.

Figure 2G:
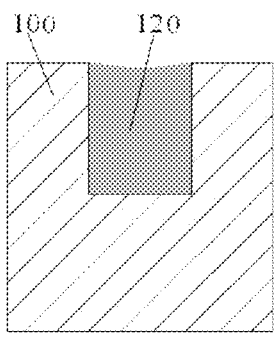

Sixth, as shown in FIG. 2G, cooling the last injected sealing gel 120 for a period of time so that the injected sealing gel 120 is solidified; after the last injected sealing gel 120 is solidified, a concave surface or depression is formed at about the middle of the surface of the solidified sealing gel 120. It should be noted that the concave surface or depression, formed in the surface of the sealing gel of FIG. 2G injected the third time, is shallower than the concave surface or depression formed in the surface of the sealing gel of FIG. 2E injected the second time, because the injection volume of the sealing gel the third time is less than the injection volume of the sealing gel the second time. In an example, the injection volume of the sealing gel the third time may be about ½ of the injection volume of the sealing gel the second time.

Figure 2H:
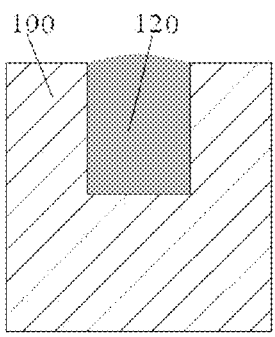

Seventh, as shown in FIG. 2H, after the sealing gel injected the third time has been cooled and solidified, continuing the injection of the sealing gel 120 into the recess 110 and stopping the injection of the sealing gel 120 when the sealing gel 120 goes beyond the sealing interface surface of the work piece 100 or the total depth of the recess 110 by a predetermined height.

Figure 2I:
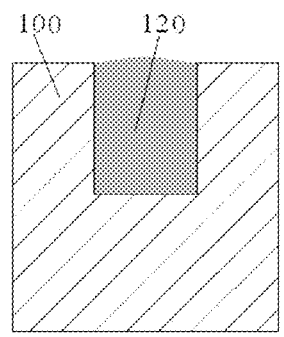

Finally, as shown in FIG. 2I, cooling the last injected sealing gel 120 for a period of time so that the injected sealing gel 120 is solidified; after the last injected sealing gel 120 is solidified, the top surface of the solidified sealing gel is still higher than the sealing interface surface of the work piece 100, and the surface of the solidified sealing gel 120 is a convex arc surface under the surface tension, instead of the concave surface or depression. As a result, as shown in FIG. 2I, the convex arc surface of the solidified sealing gel 120 goes beyond the sealing interface surface of the work piece 100. In this way, when the work piece 100 is mated with another work piece (not shown), the convex arc surface of the sealing gel extends beyond the sealing interface surface of the work piece 100 and can be compressed by the another work piece, improving the sealing performance between the work pieces.

It should be noted by those skilled in this art that the above embodiment shown in FIGS. 2B to 2I is intended to be illustrated, and not restrictive.

In an exemplary embodiment of the present invention, the first depth may be about ⅓ to ⅘ of the total depth of the recess 110.

In another exemplary embodiment of the present invention, the first depth may be about ½ of the total depth of the recess 110.

In another exemplary embodiment of the present invention, the first depth may be about ⅔ of the total depth of the recess 110.

In an exemplary embodiment of the present invention, the injection volume of the fluid sealing gel at the $(N+1)^{th}$ time may be about ½ of the injection volume of the fluid sealing gel at the $N^{th}$ time, wherein N is an integer equal to or larger than 1.

Figure 3:
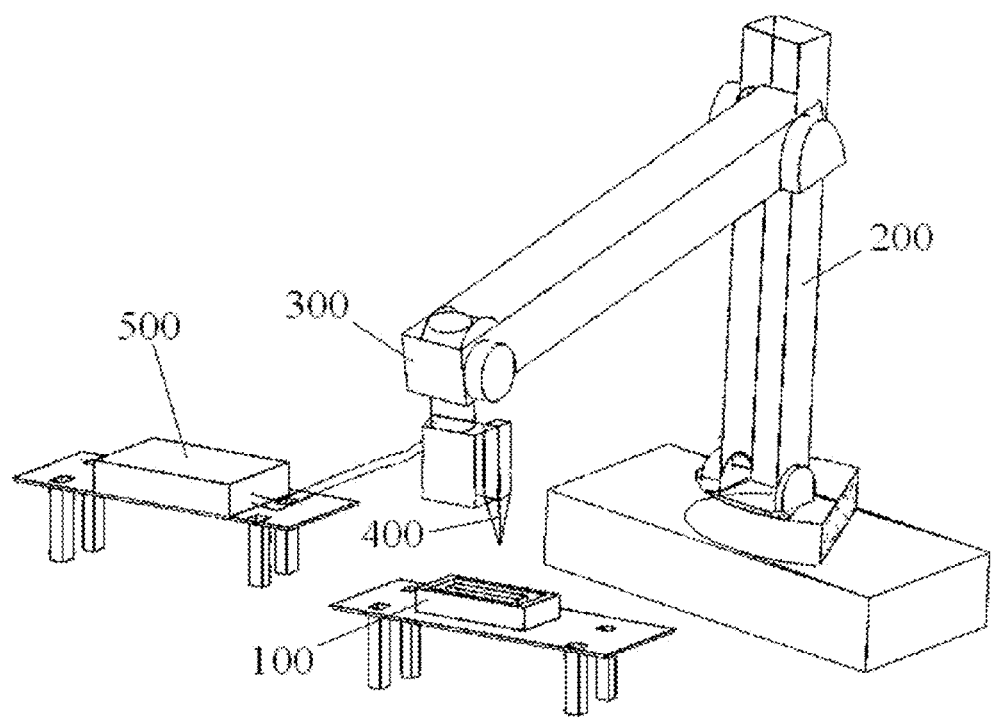
FIG. 3 is a perspective view of an automatic gel injection system according to an exemplary embodiment of the present invention.

In order to increase the gel injection speed and improve the gel injection accuracy, the injection of the sealing gel is performed by a multi-freedom robot 200, as shown in FIG. 3 which is a perspective view of an automatic gel injection system according to an exemplary embodiment of the present invention.

In the present invention, the sealing gel has a solid state and a fluid state, and the sealing gel is capable of being converted from the solid state to the fluid state by heating and capable of being converted from the fluid state to the solid state by cooling.

As shown in FIG. 3, the fluid sealing gel is supplied from a gel supply container 500 to a nozzle 400 and injected into the recess 110 through the nozzle 400.

Although it is not shown, in an exemplary embodiment, the gel supply container 500 comprises a heater for heating the sealing gel to convert the sealing gel into the fluid state and a pump for supplying the fluid sealing gel to the nozzle 400. In this way, it can ensure the sealing gel to be held in the fluid state, so that the sealing gel is continually supplied from the gel supply container 500 to the nozzle 400 and then injected into the recess 110 of the work piece 100 through the nozzle 400.

In an exemplary embodiment of the present invention, the pump is configured to be a speed adjustable pump capable of adjusting the supply speed of the fluid sealing gel.

Although it is not shown, in an exemplary embodiment, an additional heater is provided on the nozzle 400 to heat the sealing gel in the nozzle 400 so as to prevent the sealing gel in the nozzle 400 from being solidified. In some conditions, the additional heater is necessary, especially in a low temperature condition, when the sealing gel in the nozzle 400 is likely solidify. Once the sealing gel solidifies in the nozzle 400, the nozzle 400 is blocked, and can cause the entire automatic gel injection system to fail. In this way, the additional heater can keep the sealing gel in the fluid state in the nozzle 400 to prevent the nozzle 400 from being blocked. As shown in FIG. 3, the multi-freedom robot 200 has several arms and can move to a predetermined position in three-dimensional space so as to perform an accurate gel injection operation. In an exemplary embodiment, the nozzle 400 is fixed on an end effector 300 of the robot 200 and can move with the end effector 300. In the illustrated embodiments, the robot 200 moves the nozzle 400 back and forth along a path dependent on the recess 110, so as to uniformly inject the sealing gel into the recess 110.

In order to facilitate the positioning of the robot 200 in the three-dimensional space with respect to the recess of the work piece 100, the work piece 100 is prefixed on the positioning platform before injecting the sealing gel into the recess 110. The positioning platform is positioned at a preset position with respect to the robot 200. As a result, the robot 200 does not need to identify the positions of the work piece 100 and the positioning platform, and a great deal of calculation, such as a space coordinate transformation is omitted, saving the time and improving the efficiency.

In an exemplary embodiment of the present invention, the plastic work piece may be clamped by a fixture mechanism (not shown). A glue gun having the nozzle heats the fluid sealing gel to a preset temperature so that the fluid sealing gel has a good fluidity. The robot holds the glue gun and moves the glue gun along a path preprogrammed dependent on the recess, and the glue gun is opened to inject the fluid sealing gel into the recess until the fluid sealing gel reaches a part of the total depth of the recess, instead of the total depth of the recess at one time. After the robot moves the glue gun completely through the path once, a concave surface or depression is formed in the cooled sealing gel. Thereafter, the robot moves the gel gun along the path again, and the gel gun is opened to inject the fluid sealing gel into the recess again. Under the action of the high temperature of the nozzle, the cooled sealing gel at the concave surface or depression is melted again and mixed with the fluid sealing gel just injected. As a result, the concave surface or depression of the cooled sealing gel is filled by the just injected fluid sealing gel and becomes a flat surface. After the robot moves the gel gun completely through the path again, the height of the sealing gel filled in the recess is increased a bit. In this way, after the robot moves the gel gun back and forth along the path several or many times, the top surface of the sealing gel filled in the recess and is formed to be uniformly distributed along the path of the recess and go beyond the sealing interface surface of the work piece.

In an exemplary embodiment of the present invention, the speed of pumping the fluid sealing gel may be adjusted according to the size of the recess 110 in real time, and the movement speed of the robot 200 may be freely adjusted according to the pumping speed of the fluid sealing gel and the path dependent on the recess 110.

As to the prior art solution of filling a recess with the injection mold, since an injection port and a vent hole are formed in the injection mold, a residual sealing gel is generally left on the work piece at the injection port and the vent hole after finishing the injection of the fluid sealing gel. Therefore, it is necessary to remove the residual sealing gel from the work piece, taking a lot of time, and increasing the cost. In contrast, the method of the present invention does not need the injection mold and there is no need to remove residual sealing gel, thereby saving time and decreasing cost.

As to the prior art solution of filling a recess in which the fluid sealing gel is fully injected directly into the recess at one time through the opening of the recess, after the fluid sealing gel is cooled and solidified, a concave surface or depression is formed at about the middle of the surface of the solidified sealing gel resulting in the surface of the solidified sealing gel being lower than a sealing interface surface of the work piece, reducing the sealing effect of the sealing gel. In contrast, in the method of the present invention, the fluid sealing gel is injected into the recess of the work piece step by step, many times, so that the sealing gel in the recess is formed with a top surface that extends beyond the sealing interface surface of the work piece, improving the sealing performance.

In an exemplary embodiment of the present invention, the automatic gel injection system is adapted to inject the sealing gel for various different work pieces or products by correspondingly changing the control program of the automatic gel injection system. Thus, the automatic gel injection system has a wide range of applications.

It should be appreciated by those skilled in this art that the above embodiments are intended to be illustrative, and not restrictive. For example, many modifications may be made to the above embodiments by those skilled in this art, and various features described in different embodiments may be freely combined with each other without conflicting in configuration or principle.

Although several exemplary embodiments have been shown and described, it will be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A method of injecting a sealing gel into a recess of a work piece, comprising steps of:

first, injecting a sealing gel into a recess of a work piece and stopping the injection of the sealing gel when the sealing gel reaches a first depth less than a total depth of the recess;

second, after the sealing gel has cooled and solidified, continuing the injection of the sealing gel into the recess and stopping the injection of the sealing gel when the sealing gel reaches another depth higher than the first depth; and third, repeatedly performing the second step until the cooled and solidified sealing gel in the recess has a convex top surface extending beyond a sealing interface surface of the work piece and opposing edges of the convex top surface are flush with the sealing interface surface.

2. The method according to claim 1, wherein the first depth is about ⅓ to ⅘ of the total depth of the recess.

3. The method according to claim 2, wherein the first depth is about ½ of the total depth of the recess.

4. The method according to claim 2, wherein the first depth is about ⅔ of the total depth of the recess.

5. The method according to claim 1, wherein the sealing gel is injected into the recess directly through an opening of the recess.

6. The method according to claim 1, wherein the sealing gel has a solid state and a fluid state, and wherein the sealing gel is capable of being converted from the solid state to the fluid state by heating and capable of being converted from the fluid state to the solid state by cooling.

7. The method according to claim 6, wherein the fluid sealing gel is supplied from a gel supply container to a nozzle and injected into the recess through the nozzle.

8. The method according to claim 7, wherein the gel supply container comprises:
a heater for heating the sealing gel to convert the sealing gel into the fluid state; and
a pump for supplying the fluid sealing gel to the nozzle.

9. The method according to claim 8, wherein the pump is a speed adjustable pump capable of adjusting the supply speed of the fluid sealing gel.

10. The method according to claim 9, wherein an additional heater is provided on the nozzle to heat the sealing gel in the nozzle to prevent the sealing gel in the nozzle from being solidified.

11. The method according to claim 10, wherein the injection of the sealing gel is performed by a multi-freedom robot, and wherein the robot has an end effector on which the nozzle is mounted.

12. The method according to claim 11, wherein the robot moves the nozzle back and forth along a path defined by the recess, so as to uniformly inject the sealing gel into the recess.

13. The method according to claim 1, wherein the second step injects approximately half the volume of the sealing gel injected in the first step.

14. The method according to claim 13, wherein the third and subsequent steps inject approximately half the volume of the sealing gel injected in the prior step.

* * * * *